(12) United States Patent
Thornton

(10) Patent No.: US 8,634,020 B2
(45) Date of Patent: Jan. 21, 2014

(54) STRUCTURED LIGHT PROJECTION AND ACQUISITION

(75) Inventor: Jay Thornton, Watertown, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/436,201

(22) Filed: Mar. 30, 2012

(65) Prior Publication Data

US 2013/0258177 A1  Oct. 3, 2013

(51) Int. Cl.
*H04N 5/222* (2006.01)
(52) U.S. Cl.
USPC .......................................................... 348/370
(58) Field of Classification Search
USPC .......................................................... 348/370
See application file for complete search history.

(56) References Cited

U.S. PATENT DOCUMENTS

| 4,687,325 | A  | * | 8/1987 | Corby, Jr. ..................... 356/3.09 |
| 5,870,136 | A  | * | 2/1999 | Fuchs et al. ..................... 348/42 |
| 2011/0164119 | A1 | * | 7/2011 | Jeong ............................... 348/51 |
| 2012/0237112 | A1 | * | 9/2012 | Veeraraghavan et al. ..... 382/154 |

OTHER PUBLICATIONS

S. Masiokas, M.Kriuglaite; "Influence of Chromatic Ambient Light over Colour Luminance Contrast on Projection Screen", 2009, Electronics and Electrical Engineering, ISSN 1392-1215, No. 3(91).*

* cited by examiner

*Primary Examiner* — James Hannett
*Assistant Examiner* — Padma Haliyur
(74) *Attorney, Agent, or Firm* — Dirk Brinkman; Gene Vinokur

(57) ABSTRACT

A structured light pattern is projected onto a scene using pulses of light emitted by light emitting diodes (LEDs) of the projector, wherein during the pulses of the LEDs, the LEDs are driven at an overdrive current when the LEDS are ON. A sensor of a camera only integrates light from the scene during the pulses to acquire images of the scene.

16 Claims, 3 Drawing Sheets

| Conventional LEDs | | |
|---|---|---|
| Overdrive factor | Max Pulse Width | Max Duty Cycle |
| Up to rating | No limit | 100% |
| Up to 2 times | 20ms | 30% |
| Up to 3 times | 10ms | 20% |
| Up to 5 times | 2ms | 10% |
| Up to 10 times | 1ms | 5% |

| High Power LEDs | | |
|---|---|---|
| Overdrive factor | Max Pulse Width | Max Duty Cycle |
| Up to rating | No limit | 100% |
| Up to 2 times | 20ms | 30% |
| Up to 3 times | 10ms | 20% |
| Up to 5 times | 2ms | 10% |
| Up to 10 times | 1ms | 5% |
| Up to 20 times | 50us | 1% |
| Up to 100 times | 1us | 0.1% |

Fig. 3

STRUCTURED LIGHT PROJECTION AND ACQUISITION

FIELD OF THE INVENTION

This invention relates generally to determining shapes of objects using cameras, and more particularly to using structured light to determine 3D shapes in scenes.

BACKGROUND OF THE INVENTION

3D Scanning

Three-dimensional (3D) points in a scene can be determined using stereoscopic techniques, e.g., from stereo images acquired by two cameras. That technique depends on relating a pixel in one camera to the pixel in the other camera that corresponds to the same point in the 3D scene. However, it may be difficult to establish correspondences between the two cameras if the points are on a uniform surface. This makes it unclear exactly which of the many nearly identical pixels in one image correspond to a specific pixel in the other image.

SLS

For this reason, some 3D scanning techniques use a camera and a projector as a structured light scanner (SLS). The projector operates analogously to a camera, in the sense that 3D points in the scene can be associated with pixels on the projector image plane. Because the projector patterns are controlled by the SLS, it is easier to determine corresponding projector and camera pixels. The SLS becomes more compact as cameras and projectors decrease in size, e.g., the SLS can be arranged on a robot arm to assist automated machine operations, such as parts picking and assembly.

DLP

Many projectors use digital light projection (DLP). A DLP includes an array of digital micro mirrors (DMD) that can be switched independently to ON and OFF positions. Because the mirrors can switch rapidly, it is possible to use pulse width modulation (PWM) to project apparently intermediate light levels using different proportions of the "ON" and "OFF" times.

A pico-projector can enable a very small SLS. Pico-projectors typically use LEDs, which are not as bright as conventional projector bulbs. Lower brightness makes intensity (color) distinction difficult in many SLS applications, in particular when the scanned scene is dominated by ambient light because the ambient light makes the contrast in the structured light pattern low.

Strobing

The rapid switching ON and OFF is similar to strobing, which appears to stop motion. Strobing produces a very brief pulse of bright light.

SUMMARY OF THE INVENTION

A projector projects a structured light pattern onto a scene by using pulses of light emitted by light emitting diodes (LEDs) of the projector. The pulses of the LEDs are driven at an overdrive current when the LEDS are ON. A camera to integrate light from the scene by a sensor of the camera only during the pulses to acquired images of the scene and the structured light pulses.

BRIEF DESCRIPTION OF THE DRAWING

FIG. 3 shows tables of overdrive factors that can be used by embodiments of the invention.

DETAILED DESCRIPTION OF THE PREFERRED EMBODIMENTS

The embodiments of my invention provide an apparatus and method for generating and acquiring structured light patterns. The embodiments increase the contrast of the structured light in the images acquired by the camera in the presence of ambient light.

Figure 1:
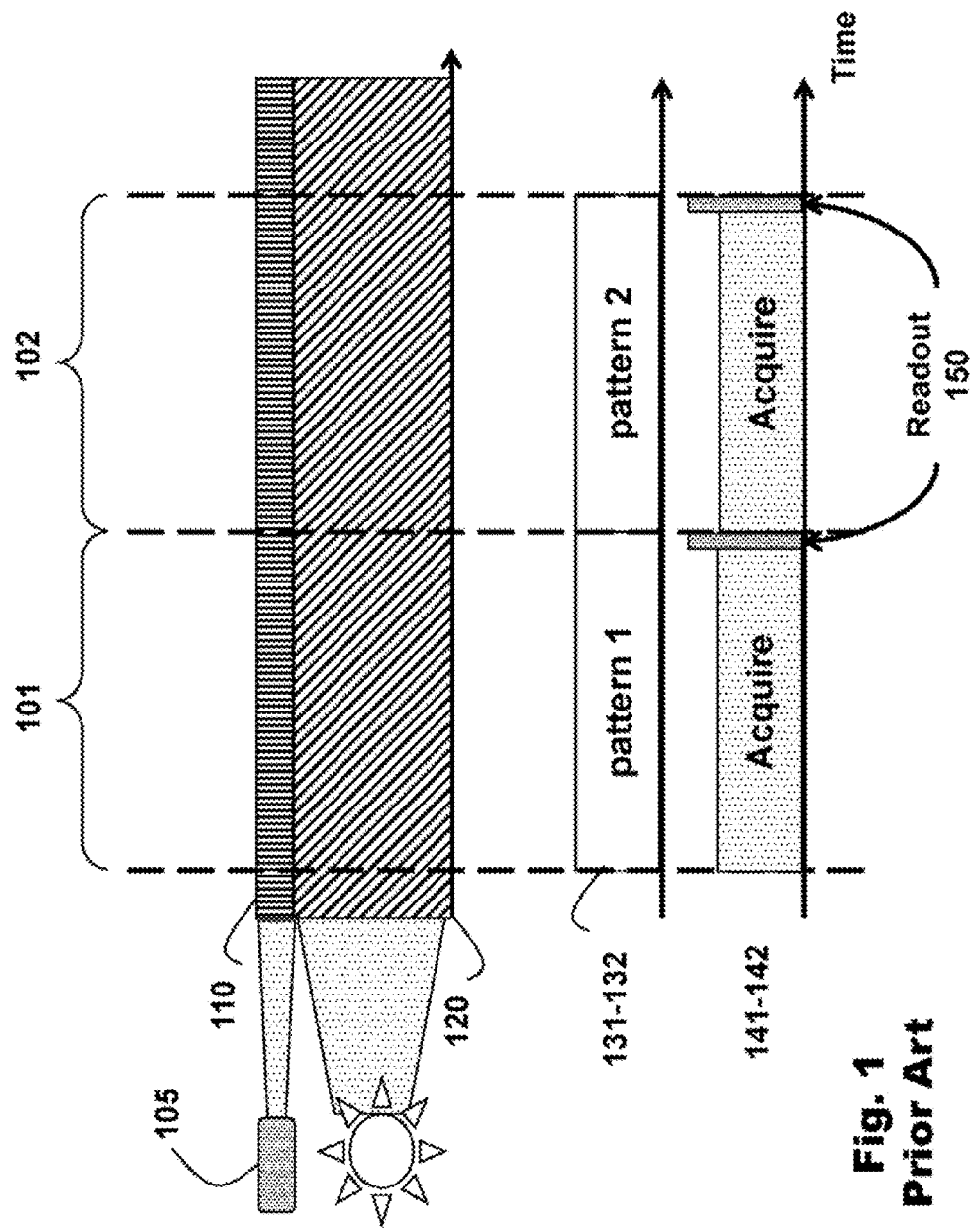
FIG. 1 is a schematic of prior art structured light projection and acquisition.

FIG. 1 shows a prior art process schematically for two time intervals 101-102 with projector structured light 110, and ambient light 120, two patterns 131-132 (pattern 1, pattern 2). Two images are captured during the two acquire intervals 141-142 at a rate of, e.g., 30 frames per second (fps). The sensor is readout 150 at the end of each interval. Generally, the patterns are a set of binary or gray-scale images. A set of color images can be also used as the patterns.

Because the ambient light and the projector 105 are ON continuously, the light in the scene is a superposition of the structured and ambient light.

The quality of structured light images can be indexed by image contrast a. $C=(\max-\min)/(\max+\min)$ b. $=(p+a-a)/(p+a+a)$ c. $=p/(p+2a),$ (1)

where a is the luminance of the ambient light, and p is the peak luminance of the projector light, i.e., the luminance in a region where "white" light is projected. The projector contributes only a small amount of light to "min," because the projected light in "black" regions is much smaller than a.

Overdriving

Figure 2:
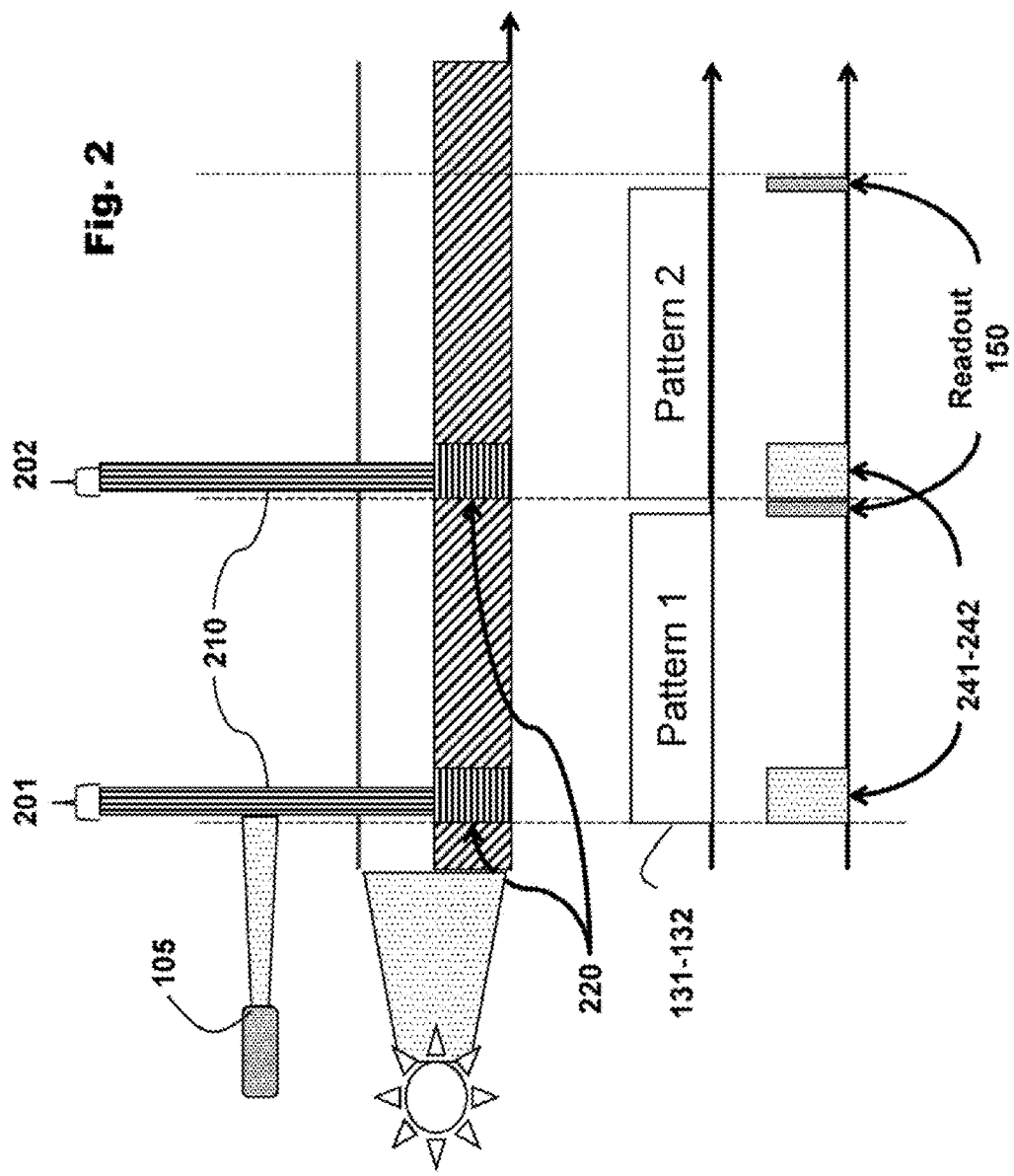
FIG. 2 is a schematic of structured light projection and acquisition according to embodiments of the invention.

FIG. 2 shows the novel method of operation of embodiments of my invention. The invention exploits both the discreteness of the camera image acquisition process, and LED "overdriving." LED overdriving refers to briefly operating the LED at higher than rated currents.

An overdriven LED can produce a light pulse an order of magnitude brighter than the level the LED can continuously produce. Since the total light intensity is directly proportional to the time the light is ON, and the amount of light emitted per unit time, the same total can be created by (e.g.) overdriving by 10 times for 1/10 the amount of time. Overdriving enables shorter pulses and therefore permits camera image integration in a briefer interval. During each image frame, the sensor of the camera acquires light in a discrete interval 141-142 during which the sensor pixels integrate the ambient and projected light. By using overdriving, the acquisition interval can be made briefer 241-242, thereby reducing the amount of ambient light integrated, while overdriving maintains the total amount of light integrated from the projector.

LEDs convert current into light roughly linearly, i.e., twice the current produces about twice the light, up to a point where thermal failure is possible. If the LED can operate at some current i, with an average (normalized) light output of l, then the LED can typically operate briefly 201-202 at a current 10i, e.g., for milliseconds without thermal damage, and produce 10l peak light output 210 at a 10% duty cycle, yet the average light and heat output over time remains the same. If the LED is OFF 90% of the time, excessive heat can readily be dissipated.

By overdriving, the projected light p in equation (1) can remain constant, while the ambient light a is reduced by r, the ratio of the duration of the original capture interval 141-142 to that of the reduced integration interval 241-242.

Substituting a'=a*r into equation (1) shows that the contrast is substantially increased. This increased contrast makes the SLS output more accurate and produces depth images with fewer artifacts and noise.

Using overdriving, the contrast of the structured light 210 can overwhelm the ambient light 220 for a brief interval in time. If the sensor acquisition time is reduced to the interval of time when the LED is ON, and a minimal amount of additional time, then the contrast of the structure light pattern captured by the camera can be greatly increased.

For example, suppose the sun illuminance on the object being scanned is 50 lux and the peak projector illuminance on that object is only 10 lux. Furthermore assume that when the projector pattern is a typical one with ½ white bars and ½ black bars that the ratio of the light in the white areas to the black bars is 100:1. Then, if there were no ambient light, then the projector contrast is:

a. $C_{projector}$=(max−min)/(max+min)

b. =(100−1)/(100+1)

c. =99/101~98%, which is near optimal.

If the ambient light is added, then the contrast is drastically reduced:

a. $C_{projector+ambient}$=(max−min)/(max+min)

b. =(50+10−50−10/100)/(50+10+50−10/100)

c. =(9.9)/(110.1)

d. ~9%, which is poor.

However if the LED is overdriven by 20 time, and the acquisition time is reduced by 20 times, thereby reducing the ambient light capture by to 50/20, while preserving the same amount of light acquired from the projector, then the contrast is:

a. $C_{overdriving+ambient}$=(max−min)/(max+min)

b. =(50/20+10−50/20−10/100)/(50/20+10+50/20+10/100)

c. =(9.9)/(15.1)

d. ~65%, which is very good.

Although the invention has been described with reference to certain preferred embodiments, it is to be understood that various other adaptations and modifications can be made within the spirit and scope of the invention. Therefore, it is the object of the append claims to cover all such variations and modifications as come within the true spirit and scope of the invention.

I claim:

1. A method for generating and acquiring structured light pattern, comprising:
    projecting the structured light pattern onto a scene, wherein the structured light pattern is projected using pulses of light emitted by light emitting diodes (LEDs), wherein the pulses are emitted at regular time intervals, and wherein during the pulses of the LEDs, the LEDs are driven at an overdrive current when the LEDS are ON; and
    integrating light from the scene by a sensor of a camera only during acquiring intervals when the pulses are ON to acquire images of the scene, wherein the acquiring intervals are substantially shorter than the regular time intervals.

2. The method of claim 1, wherein the scene is subject to ambient light, and the ambient light overwhelms projected structured light obtained while driving the LEDs at normal current, and the overdrive current is at least twice the normal current.

3. The method of claim 1, further comprising:
    driving the LEDs at 0 current when the LEDs are OFF.

4. The method of claim 2, wherein a total amount of light flux originating from the projector and integrated by the sensor for each image is substantially identical to the light flux when the images are acquired while the LEDs are driven at the normal current.

5. The method of claim 1, further comprising:
    determining a shape of an object in the scene using the structured light pattern.

6. The method of claim 1, wherein the projecting is performed by digital light projection.

7. The method of claim 1, wherein the projecting is performed by liquid crystal projection.

8. The method of claim 1, wherein is performed by a pico-projector.

9. The method of claim 1, wherein a camera acquires the images of the scene while projecting the structured light pattern.

10. The method of claim 1, wherein the images are acquired at a frame rate of the camera.

11. The method of claim 1, wherein a quality of the structured light pattern in an image of the scene is $C=p/(p+2a)$, where a is a luminance of ambient light, and p is a peak luminance of the structured light pattern.

12. The method of claim 1, wherein an overdriven current for the LEDs is an order of magnitude larger than a normal current.

13. The method of wherein the images are binary images.

14. An apparatus for generating and acquiring structured light pattern, comprising:
    a projector configured to project the structured light pattern onto a scene, wherein the structured light pattern is projected using pulses of light emitted by light emitting diodes (LEDs) of the projector, wherein the pulses are emitted at regular time intervals, and wherein during, the pulses of the LEDs are driven at an overdrive current when the LEDS are ON; and
    a camera configured to integrate light from the scene by a sensor of the camera only during acquiring intervals when the pulses are ON to acquired images of the scene, wherein the acquiring intervals are substantially shorter than the regular time intervals.

15. The method of claim 1, wherein the acquiring intervals are substantially shorter then the regular time intervals.

16. The method of claim 1, wherein the acquiring intervals are about 10% in length of the regular time intervals.

* * * * *